United States Patent [19]
Pinard et al.

[11] Patent Number: 5,961,691
[45] Date of Patent: Oct. 5, 1999

[54] RECOVERY OF LEAD AND OTHERS METALS FROM SMELTER FLUE DUSTS

[75] Inventors: Denys Pinard, Rouyn-Noranda; Jean Guimont, Quebec, both of Canada

[73] Assignee: Noranda, Inc., Canada

[21] Appl. No.: 08/942,546

[22] Filed: Oct. 1, 1997

[51] Int. Cl.$^6$ .......................... C21B 15/00; C01G 17/04; C01G 9/00; B01D 11/00

[52] U.S. Cl. ............................. 75/743; 75/961; 423/94; 423/494; 423/98

[58] Field of Search .......................... 75/743, 961, 424, 75/429; 423/98, 1, 494, 94

[56] References Cited

U.S. PATENT DOCUMENTS

| | | | |
|---|---|---|---|
| 4,013,456 | 3/1977 | Bergsoe | 75/77 |
| 4,096,045 | 6/1978 | Ahonen et al. | 423/94 |
| 4,266,972 | 5/1981 | Redondo-Abad et al. | 75/101 R |
| 4,337,226 | 6/1982 | Peasley et al. | 423/22 |
| 4,372,782 | 2/1983 | Salter et al. | 75/118 R |
| 4,381,873 | 5/1983 | Johnson et al. | 299/5 |
| 4,410,358 | 10/1983 | Heshmatpour | 75/10 R |
| 4,410,496 | 10/1983 | Smyres et al. | 423/1 |
| 4,655,829 | 4/1987 | Cashman | 75/101 |
| 4,739,973 | 4/1988 | Herndon | 266/101 |
| 4,891,067 | 1/1990 | Rappas et al. | 75/101 |
| 5,032,175 | 7/1991 | Raborar et al. | 75/416 |
| 5,246,486 | 9/1993 | Brierley et al. | 75/743 |
| 5,256,186 | 10/1993 | Player et al. | 75/695 |
| 5,443,622 | 8/1995 | Gabb et al. | 75/743 |
| 5,523,066 | 6/1996 | Geisler et al. | 423/98 |
| 5,538,532 | 7/1996 | Keegel, Jr. | 75/10.63 |
| 5,573,575 | 11/1996 | Kohr | 75/712 |
| 5,611,839 | 3/1997 | Kohr | 75/712 |

OTHER PUBLICATIONS

"Bismuth Recovery From Copper Smelting Dust", S. Asahina, et al., NT, AIME Dec. 1976, vol. 2, Chapter 54, pp. 856–874. *World Mining and Metals Technology*.

*Society For Mining Metallurgy, and Exploration, Inc.*, D. Steele, et al., Preprint No. 91 100, Feb. 1991, SME Annual Meeting, pp. 1 to 10. "Metal Recovery from Acid–Leach Processing of Arsenic–Containing Wastes".

"Bismuth at Rokana copper smelter," Zambia, its behaviour and extraction from flue dusts, R. Hanks, et al., Jun. 1979, *Hydro metallurgy*, pp. C99–C104.

"Removal and recovery of minor elements in copper smelting", J. Hino, et al. *Proceedings of COPPER 95 COBRE 95, Internat'l Conf.*, vol. III, pp. 617 to 627.

"Combined hydrometallurgical treatment of copper smelter dust and lead smelter copper dress", T. Shibasaki, et al., *Hydrometallurgy*, 30 (1992) 45–57, Dec. 10, 1991.

"Current Operation at Kosaka Smelter and Refinery", J. Minoura, et al., *Metallurgical Review of MMIJ*, vol. 1, No. 2 (1984)–technical report pp. 138–156, Sep. 21, 1984.

"Criteria for Optimization of Recycling Processes of Primary and Secondary Copper", N. Piret, *Internat'l Symposium of Recycling of Metals and Engineered Materials*, The Minerals, Metals & Materials Society, Dec. 1995, pp. 189 to 214, undated.

"Treatment of Copper Smelting and Refining Wastes", D. Steele, et al., (U.S.) *Bureau of Mines, Report of Investigations 9522*, Dec. 1994.

"Treatment of Electric Arc Furnace Dust Using Chlorine/Air", D. Frag, Extraction and Processing for the Treatment and Minimization of Wastes, *The Minerals, Metals & Materials Society*, Dec. 1993, pp. 627 to 636.

"Electric arc furnace flue dusts: characterization and leaching with sulphuric acid", M. Cruells, et al., *Hydrometallurgy*, 31(1992) pp. 213 to 231, Oct. 8, 1991.

"Recovery of Copper, Silver and Zinc from Huelva (Spain) Copper Smelter Flue Dust by a Chlorine Leach Process", C. Nunez, et al., *Hydrometallurgy*, 14 (1985), pp. 93 to 103, Aug. 16, 1984 and Nov. 24, 1984.

*Primary Examiner*—Scott Kastler
*Assistant Examiner*—Tima McGuthry-Banks
*Attorney, Agent, or Firm*—Fitzpatrick, Cella, Harper & Scinto

[57] ABSTRACT

The present invention is concerned with a process for extracting and recovering lead or lead derivatives in high purity from various materials containing lead sulphate, and Schematic flow sheet of the process particularly copper smelter flue dusts. The present process also allows the substantially complete recovery or recycling of precious metals otherwise lost in flue dusts wastes.

15 Claims, 2 Drawing Sheets

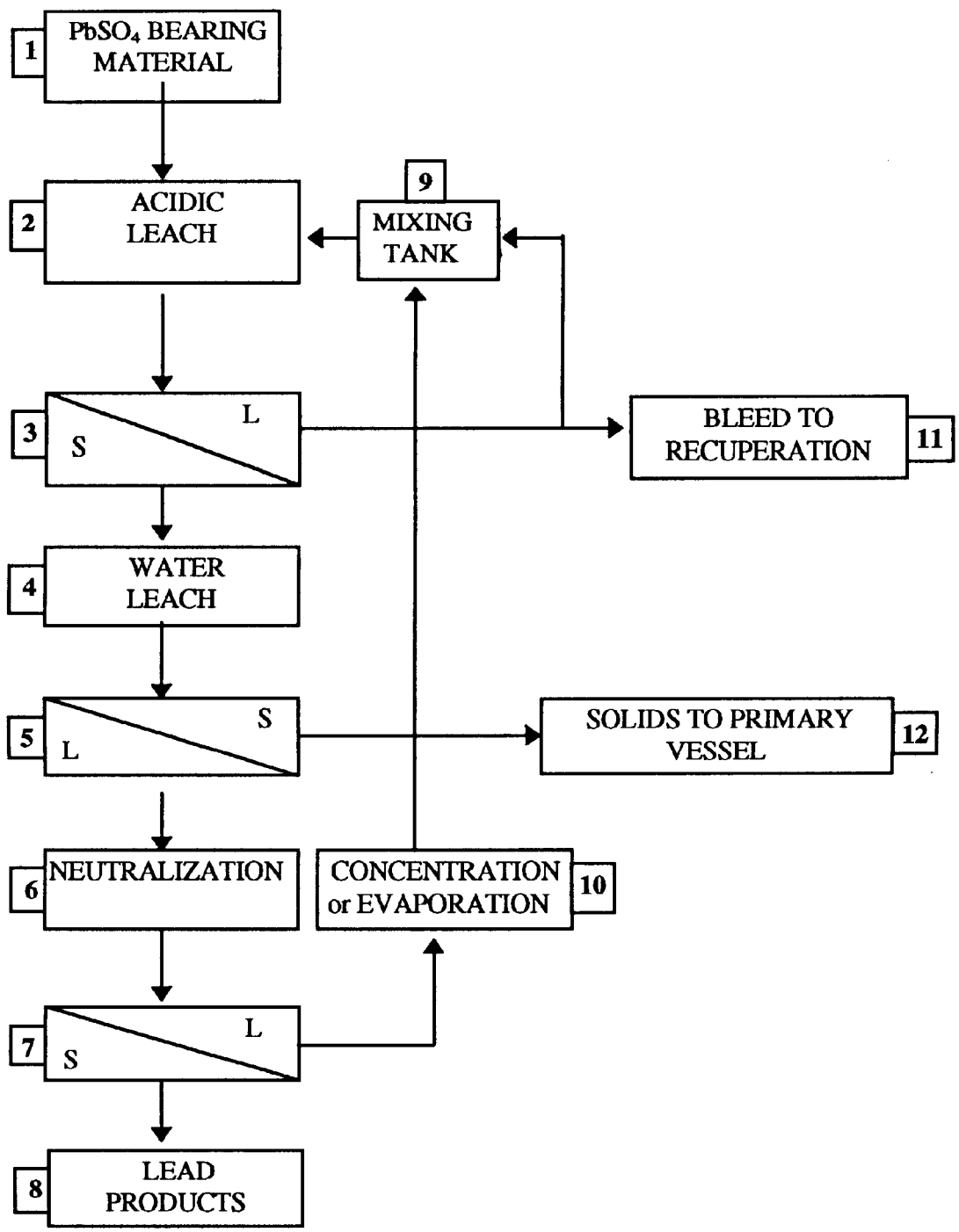
Fig. 1 Schematic flow sheet of the process

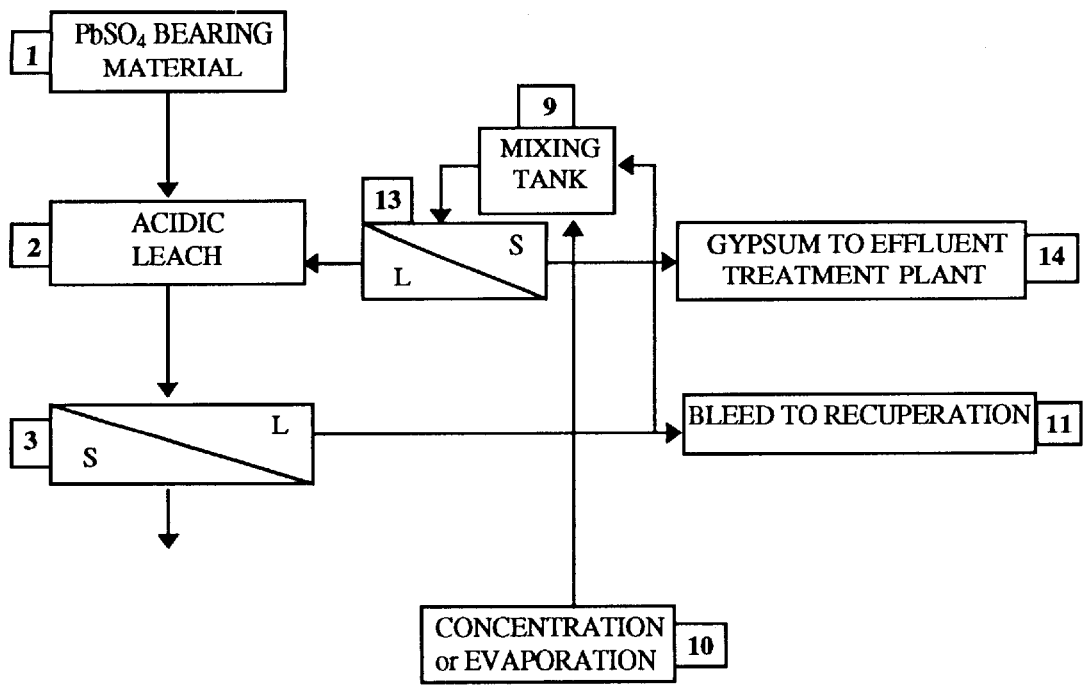
Fig. 2 Modification to the original flow sheet if calcium salts are used in the neutralization step
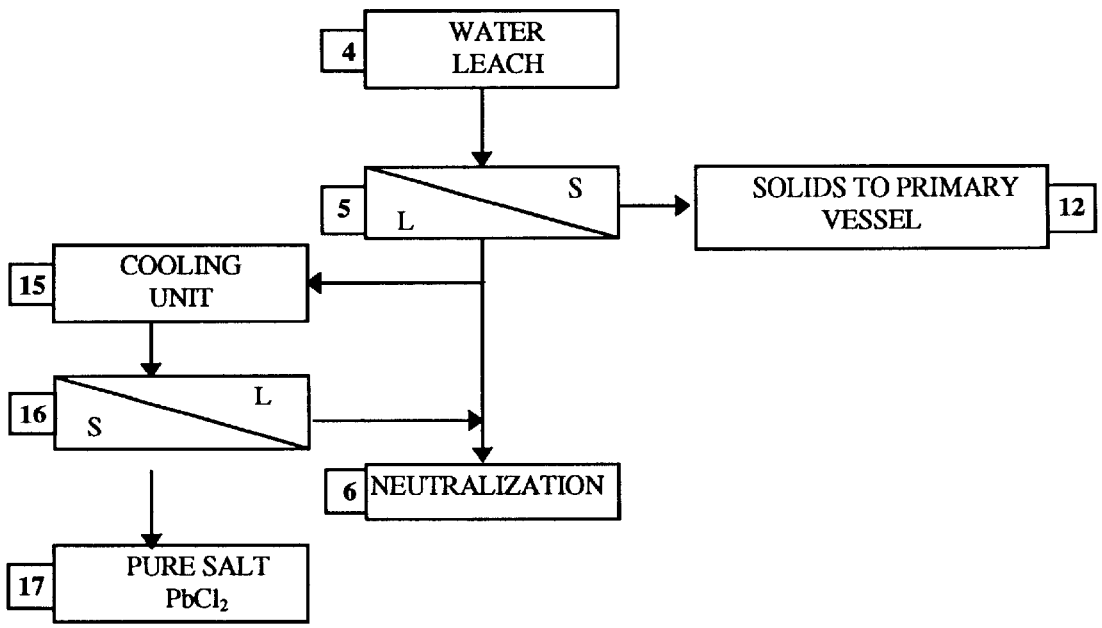
Fig. 3 Modification to the original flow sheet which allows the production of pure PbCl$_2$

RECOVERY OF LEAD AND OTHERS METALS FROM SMELTER FLUE DUSTS

FIELD OF THE INVENTION

The present invention is concerned with a process for extracting and recovering lead in good purity by-products from smelter flue dusts. The present process also allows the substantially complete recovery or recycling of precious metals otherwise lost in flue dusts wastes.

BACKGROUND OF THE INVENTION

Copper pyrometallurgy can be summarized as a multistep process wherein each step is responsible for removing one or more impurities to ultimately obtain pure copper metal. These impurities include, in addition to non metallic compounds, a variety of metals present in the feeding material of the primary pyrometallurgical vessel of the smelter. Some of these metals, like silver and gold, are desirable because of their value and they will find there way in the copper produced from the smelting operation. They will then be extracted during subsequent copper refining. Therefore, necessary efforts are made to ensure that these precious metals are not lost during the pyrometallurgical process.

During the smelting of copper concentrates and matte converting, metals like lead, mercury, arsenic, tin, cadmium, bismuth, silver, zinc, etc. are completely or partially volatilized, and therefore end up in the gases exiting the furnace. The gas stream will also carry small splash particles from the slag and the matte. Likewise, these particles contain precious metals like silver and gold, as well as copper. In the gas cleaning operations, most of the volatilized metals will be condensed and recovered as dust in electrostatic precipitators. The particle size of this fine dust is on the order of 2 microns or less, contains mainly sulphates, like lead, copper and zinc sulphates, and oxides, like tin and bismuth oxides. Chlorides like silver chloride may also be present in smaller concentrations. The splash particles are on the other hand bigger, typically from a few tens to a few hundreds of microns, and also recovered in the precipitators. The flue dusts therefore comprise a fine dust mixed with coarser particles.

Although flue dusts are an effective bleed for removing undesirable impurities from copper matte, they nevertheless contain non-negligible amounts of precious metals, which means that their disposal represents a significant economic loss, and may also create unacceptable environmental problems. For these reasons, most industrial copper smelters recycle most of their flue dusts in the primary pyrometallurgical vessel, particularly that recovered from the precipitators. The unrecycled fraction of the flue dusts is generally forwarded directly to a lead smelter, and may sometimes be treated prior to being forwarded there. This operation constitutes important costs for copper smelters. The treatment of lead sulphate is indeed expensive because heavy fines are imposed by lead refiners if impurities like arsenic, bismuth, cadmium, copper, tellurium, chlorine etc. are present in the dusts used as feed materials for lead smelters.

Flue dusts can be treated pyrometallurgically, such as for example in U.S. Pat. No. 4,013,456 or U.S. Pat. No. 5,256, 186, but generally, hydrometallurgical methods are much preferred. It is well known that metals like copper, zinc, cadmium and arsenic are already soluble in water at various degrees. U.S. Pat. No. 4,891,067 proposes the selective solubilization of lead, arsenic, molybdenum and antimony in a caustic media.

The use of sulphuric acid for increasing the dissolution of copper and other impurities is conventionally done by many smelters throughout the world, and several publications acknowledge this fact. See for example: Piret in the $3^{rd}$ International Symposium on Recycling of Metals and Engineered Materials, 1995, 189–214; Minoura et al. in Metallurgical Review of the MMIJ, 1984, 1 (2), 138–156;Shibasaki et al. in *Hydrometallurgy*, 1992, 30, 45–57; and Ino et al. in Proceedings of Copper 95 International Conference, 1995, 3, 617–627. Under higher sulphuric acid concentrations, a significant amount of bismuth is solubilized, which may be recovered by dilution, cementation or neutralization, as illustrated in Hanks et al. in Transactions of IMM, Section C, 1979, 99–106.

The addition of chloride ions, either through sodium chloride or hydrochloric acid, solubilizes bismuth as well as a significant amount of silver present in flue dusts. See Asahina et al. in Proceedings of the joint Meeting MMIJ-AIME, 1977, 2, 856–874; and *Hydrometallurgy*, 1985, 14, 93–103. U.S. Pat. No. 5,443,622 is concerned with a process using a liquor containing chlorides and fluorides to solubilize bismuth and the recovery of cadmium, arsenic and bismuth.

In all of the above methods and processes, the lead present remains in the form of impure lead sulphate that must be either recycled to the primary pyrometallurgical vessel of the copper smelter or forwarded to a lead smelter with all the economic drawbacks described above.

In the treatment of sulphur ores containing lead, as for example in U.S. Pat. No. 4,266,972 and U.S. Pat. No. 4,410,496, lead and most other metals in the ore are leached under oxygen overpressure in an acidic media containing chloride ions. Subsequent metals recovery in the pregnant solution is realized by various known techniques.

U.S. Pat. No. 4,372,782 discloses a method for recovering lead and silver from ores and side products containing lead sulphate. In this method, lead is solubilized in an acidic solution having a pH of about 1,5 and highly concentrated in chloride ions, e.g., 269 g/L of NaCl. Calcium chloride is used to eliminate the excess of sulphate and to increase the solubility of the lead up to about 18 g/L. Following a liquid/solid separation, lead oxychloride is precipitated by adding lime. Subsequently, the oxychloride is calcined at 400° C. with lime to produce calcium plumbate which will be forwarded to a lead smelter. This process does not allow the elimination of bismuth from the lead, and because of the low solubility of lead sulphate in the media, i.e., 18 g/L, a significant capital investment is required to be able to treat tens of tons of flue dusts rich in lead that are produced daily in conventional copper smelters.

It would therefore be highly desirable to develop an efficient process for the hydrometallurgical treatment of flue dusts produced from smelters. Such process should allow a substantially complete extraction and recovery of lead and precious metals economically. Moreover, the lead or lead derivatives obtained should be of good purity to eliminate fines charged by lead smelters for refining such product.

SUMMARY OF THE INVENTION

In accordance with the present invention, there is now provided a process for extracting and recovering substantially all lead from solid materials containing lead in the form of lead sulphate, and more particularly flue dusts generated from copper smelter.

More specifically, the process comprises the steps of:
   a) leaching the lead sulphate-containing material with an acidic solution containing a sufficient concentration of chloride ions to solubilize metals in the solution and convert solid lead sulphate to solid lead chloride, with the proviso that the concentration of chloride ions is not sufficient to solubilize substantial amounts of lead, and the pH of the acidic solution is not higher than 0.5;

b) carrying a solid/liquid separation to separate a solid fraction and an acidic liquid fraction;

c) leaching the solid fraction obtained in step b) with water to selectively dissolve lead chloride;

d) recovering a lead chloride solution of step c) after solid/liquid separation if necessary, and e) optionally converting the lead chloride to lead metal or other lead derivatives, whereby substantially all the lead present in the lead sulphate-containing material has been extracted therefrom.

In a preferred embodiment, the acidic solution is a sulphuric acid solution containing sodium chloride as the chloride ion source.

IN THE DRAWINGS

FIG. 1 illustrates a schematic flow sheet of the present process;

FIG. 2 illustrates the modification to the flow sheet of FIG. 1 when calcium salts are used in the neutralization step with an HCl leaching solution; and FIG. 3 illustrates the modification to the flow sheet of FIG. 1 which allows the production of pure lead chloride.

DETAILED DESCRIPTION OF THE INVENTION

In the process of the present invention, flue dusts obtained from copper smelting operations are hydrometallurgically treated to recover lead in a commercially advantageous form. The process also allows the substantially complete recovery of all precious metals present in the flue dusts. Although the present process is particularly advantageous for flue dusts produced from copper smelters, it should be noted that it can be applied to any material containing lead in the form of lead sulphate or converted thereto before performing the process.

Because of the presence of slag and matte splash particles in the flue dusts recovered from the electrostatic precipitators, the following optional preliminary treatment may be carried out first on the flue dusts before proceeding with the present process. Such preliminary step is justified by the fact that slag and matte splash particles are coarser than regular flue dusts particles. Typically, the preliminary process comprises mixing the dust in water to form a slurry that is subsequently submitted to gravimetric separation to produce a concentrate of splash particles of slag and matte, and a residue of smaller particles. This concentrate is recycled to the primary pyrometallurgical vessel. The residue is optionally acidified, preferably with sulphuric acid, at a pH between about 0.7 to 2.5, to dissolve as much copper, zinc, cadmium and arsenic. The slurry is then filtered, and the filtrate, after recovering the copper therein in any conventional manner, such as cementation with iron, is transferred to the effluent treatment plant. The filtration cake contains substantially all the lead in the form of lead sulphate, as well as substantially all the bismuth, tin and a large fraction of silver originally present in the flue dusts. It may also contain significant amounts of gold and copper, as well as low concentrations or arsenic, zinc, cadmium and iron. It is this filtration cake that is treated in accordance with the present process. It should be noted that the residue may also be treated in accordance with the present invention right after the gravimetric separation. Also, the flue dusts can be treated directly in accordance with the present process without going through the preliminary steps described above.

In the present process, a lead sulphate slurry is leached with an acidic solution containing a sufficient concentration of chloride ions to solubilize bismuth and convert lead sulphate to lead chloride. The pH of such solution is preferably between 0 to 0.5 to ensure efficient conversion of lead sulphate to lead chloride. Both the concentration of chloride ions and acid will vary depending on the percentage of solid particles of flue dusts in the leach reactor and the concentration of lead sulphate in the flue dusts. However, and this is critical to the process, the concentration of chloride ions must be sufficient to allow the conversion of lead sulphate to lead chloride, but low enough to avoid solubilization of lead in the form of a soluble complex of $PbCl_3^-$. In accordance with the present process, the slurry contains, after the acidic leaching, a solid fraction of lead chloride, gold as well as other insoluble metals. Following a liquid/solid separation, the metals dissolved in the liquid phase are recovered in a conventional manner, such as by hydrolysis, cementation, neutralization or ion exchange. With respect to the solid fraction, it is leached with hot water to selectively solubilize lead chloride, and the remainder of the solid fraction is then returned to the primary pyrometallurgical vessel. The leaching solution substantially contains only lead chloride, which can be recovered as metallic lead by cementation with iron or by electrowinning, or as other lead salts of good purity after conventional conversion treatment.

If the flue dusts contain silver in the form of silver chloride, the conditions according to the present process for converting lead sulphate to lead chloride will allow this silver salt to solubilize. The silver can subsequently be recovered with the other metals such as bismuth, copper and tin in a conventional manner. Alternately, if one prefers to keep the silver in the solid phase, cementation with copper cement, chips or scrap can be done simultaneously with the leaching step. Cemented silver will therefore end up in the solid phase with unreacted metallic copper and lead chloride, while the solubilized copper freed from the cementation reaction will be recovered from the solution conventionally.

Further features, objects and advantages will become apparent from the following detailed description of the preferred embodiments of the present invention taken in conjunction with the accompanying drawings. This description shall be construed as illustrating the invention rather than limit its scope.

Referring to FIG. 1, the flue dusts 1, whether or not treated in accordance with the preliminary treatment described above, or in fact any material containing lead sulphate, are leached in 2 with an acidic chloride-containing solution at a temperature of from 20 to 90° C., and preferably between 30 and 60° C. under atmospheric pressure. The chloride source may be any chloride salt soluble in acid, provided that no interference in the reaction is caused by the cation. Sodium chloride is the most preferred because of its availability and low cost. As stated above, the concentration of the acid and chloride ions therein must be such that bismuth as well as other elements like copper, zinc, cadmium, arsenic etc. in the flue dusts are solubilized while substantially all lead sulphate is converted to lead chloride without solubilization of lead in the form of $PbCl_3^-$. This solid-to-solid conversion can be explained as follows. Lead sulphate is only very slightly soluble in acidic solutions. Because the acidic solution contains an excess of chloride ions, as soon as a molecule of lead sulphate dissolves, the lead ion freed reacts with a chloride ion in solution to form lead chloride which, because of the experimental conditions provided, instantly precipitates. Therefore, although it may look like nothing happens in the reaction media since both lead sulphate and lead chloride are white powders, there is in fact a reaction taking place.

After a solid/liquid separation 3, a solution 11 containing several metals of interests, such as bismuth, copper, tin and optionally silver is obtained, as well as a solid containing mainly lead chloride and other elements like gold, and optionally silver. The solid is leached with hot water at 4 to selectively solubilize substantially all the lead chloride. Hot water is preferred to cold water for obvious solubility reasons, the solubility of lead chloride being higher in the former, i.e., 26 g/L at 80° C. instead of 12 g/L at 30° C. Since substantially all the original compounds and elements soluble in water have already been removed, lead chloride is therefore selectively solubilized in hot water. Accordingly, lead is dissolved in the free $Pb^{2+}$ state, instead of the complex form $PbCl^{3-}$. This is a significant advantage over known processes using direct solubilization of lead sulphate in highly concentrated chloride media, because undesirable precipitation of lead oxychlorides is avoided. Leaching step 4 is followed by a further liquid-solid separation 5 wherein the solid 12 containing precious metals is recovered and recycled to the primary pyrometallurgical vessel. The liquid phase almost exclusively contains lead chloride dissolved in water, and the lead can therefore be recovered in that form, or converted to elemental lead, lead oxide, lead hydroxide, lead carbonate, lead chloride or any other commercial form in any conventional manner. For example in 6, a simple neutralization with lime, magnesium hydroxide, sodium hydroxide or any other basic material, under pH 9, leads to the precipitation of lead hydroxide, which can be recovered by a liquid/solid separation 7. Sodium carbonate may also be used, and causes lead to precipitate in the form of basic lead carbonate. The lead may also be recovered by other conventional methods such as cementation. A last solid/liquid separation 7 gives the desired lead compound, and the chloride-rich solution may optionally be the subject of a concentration or evaporation step 10 and recycled to step 2 of the process through a mixing tank 9 that also receives the recycled fraction of the leaching solution.

As noted in the Background, during the smelting process, the gas stream carries coarse particles (such as splash particles, slag, and matte), as well as fine dust particles (on the order of two microns or less). Before the leaching step, therefore, the gas stream may be submitted to the following preliminary treatment: (i) the flue dusts are mixed in water to form a slurry that is submitted to well-known gravimetric separation to produce a concentrate of splash particles of slag and matte, and a residue of smaller particles; and (ii) the concentrate of splash particles is then returned to the primary pyrometallurgical vessel, and the smaller particles are then submitted to the leaching step discussed above.

As illustrated in FIG. 3, cooling of the lead chloride solution at 15 before neutralization 6 will crystallize substantially pure lead chloride 17 which can be recovered by a simple solid/liquid separation step 16. This cristalline lead chloride salt may be redissolved in hot water and used as a starting material to produce high purity lead metal or lead products through steps 6–8 of FIG. 1.

The use of lime for neutralizing the lead chloride solution is economically advantageous, but the presence of calcium ions in the mixing tank 9 will result in the precipitation of gypsum. If the gypsum is not removed from the solution, it will be partially leached by the hot water during step 4 with the lead chloride, and cause precipitation of lead sulphate, which will be recycled to the primary pyrometallurgical vessel with the precious metals. To minimize these lead losses, as illustrated in FIG. 2, gypsum formation should be maximized in mixing tank 9, for example by adding sulphuric acid, and filtering the gypsum newly formed at 13 and optionally at 14, and transferring it to the effluent treatment plant.

Typically in a batch process, a 200 g/L sulphuric acid solution containing 200 g/L of NaCl is fine. In a continuous process, the concentration of sulphuric acid remains unchanged but the concentration of NaCl may be lowered to 150 g/L. Preferably, a mass ratio ($H_2SO_4$ mass/$PbSO_4$ mass) and (NaCl mass/$PbSO_4$ mass) of about 1.6 is maintained for a density of flue dusts particles in the slurry of around 12%. If the density of particles in the slurry is higher, say 17%, a mass ratio of about 1.2 is maintained, and if the density is lower, say 9%, a mass ratio of 1.8 is maintained. In general, a mass ratio between 1.0 and 2.0 is most preferred, but could be higher or lower depending on the density of flue dusts particles in the acidic solution. Further preferred experimental conditions include a temperature of the acidic leaching solution around 50° C. and a residence time of the flue dusts particles in the leaching solution of about from about 30 minutes to 2 hours. Under these conditions, substantially all lead sulphate is converted to lead chloride, and about 96% of the bismuth and 95% of the silver are dissolved.

Similar results have also been obtained with various densities by replacing sulphuric acid and NaCl in step 2 with a 80 g/L hydrochloric acid solution. In this case, the hydrochloric acid solution therefore acts as both the chloride ions provider and the acidic solvent. There is therefore much less sulphate ions in solution, which results in a shorter reaction time because the inhibiting effect of the sulphate ions in the solution is reduced. As a result, the reaction can be carried out at room temperature, generally within one hour. Mixtures of hydrochloric acid and sodium chloride may also be used. For example, a leaching solution containing 55 g/L of hydrochloric acid with 90 g/L NaCl works well in a batch process for a slurry containing about 12% of flue dusts particles.

With the present process, lead is recovered from the flue dusts in a yield exceeding 90%, and the products obtained after the neutralization step do not contain hazardous impurities and are totally compatible with lead pyrometallurgy, thus minimizing subsequent smelting costs, and representing an overall economic advantageous operation because:

lead being of high grade, it can be sold directly to customers after conversion to the required product (lead, lead oxide, lead hydroxide etc.), or forwarded to a lead smelting operation without the need of paying hefty fines;

substantially all the precious metals present in the flue dusts are either recovered or recycled to the primary pyrometallurgical vessel of the smelter. Therefore, nothing is lost;

the process requires little investment and the reagents used are cheap. For example, in one of the preferred embodiment, the leaching solution comprises sodium chloride dissolved in sulphuric acid. Because most smelters have sulphuric acid plants, they can draw whatever amount of acid required to carry on the process, and sodium chloride is readily available and inexpensive.

Bleeding fraction 11 from the leaching solution that has been enriched with recycling, may be treated by cementation, hydrolysis, neutralization or any other conventional technique to recover metals having a commercial value, such as silver, bismuth, tin, indium, zinc and copper present therein.

Table 1 presents the results of lead analysis for dried lead products (at 105° C.) obtained in accordance with the process of the present invention. As it can be seen, high grade quality products have been obtained.

TABLE 1

| | Lead content for lead products | | |
|---|---|---|---|
| | Products | | |
| | PbO•Pb(OH)$_2$ (lead hydroxide) | 2 PbCO$_3$•Pb(OH)$_2$ (basic lead carbonate) | PbCl$_2$ (lead chloride) |
| % lead (measured) | 88.8 | 81.9 | 74.8 |
| % lead (theo.) | 89.2 | 80.1 | 74.7 |

While the invention has been described in connection with specific embodiments thereof, it will be understood that it is capable of further modifications and this application is intended to cover any variations, uses or adaptations of the invention following, in general the principles of the invention and including such departures from the present disclosure as come within known or customary practice within the art to which the invention pertains, and as may be applied to the essential features hereinbefore set forth, and as follows in the scope of the appended claims.

What is claimed is:

1. A process for extracting and recovering substantially all lead from material, containing solid lead sulphate and metals the process comprising the steps of:
   a) leaching the lead sulphate-containing material with an acidic solution containing a sufficient concentration of chloride ions to solubilize the metals in the solution and convert solid lead sulphate to solid lead chloride, with the proviso that the concentration of chloride ions is not sufficient to solubilize substantial amounts of lead, and pH of the acidic solution is not higher than 0.5;
   b) carrying out a solid/liquid separation on the slurry which results from the leaching step a) to separate a solid fraction and an acidic liquid fraction;
   c) leaching the solid fraction obtained in step b) with water to selectively dissolve lead chloride;
   d) recovering the lead chloride solution of step c) after solid-liquid separation, and
   e) optionally converting the lead chloride to lead metal or other lead derivatives, whereby substantially all the lead present in the lead sulphate-containing material has been extracted therefrom.

2. A process according to claim 1 wherein the acidic solution is a sulphuric acid or a hydrochloric acid solution.

3. A process according to claim 2 wherein the sulphuric acid or hydrochloric acid solution contains sodium chloride.

4. A process according to claim 3 wherein the mass ratio (sulphuric acid mass/lead sulphate mass) and (sodium chloride mass/lead sulphate mass) varies from 1.0 to 2.0.

5. A process according to claim 1 wherein the lead-sulphate material is flue dusts obtained from smelting operations.

6. A process according to claim 5 wherein the smelting operation is a copper smelting operation.

7. A process according to claim 1 wherein the acidic solution obtained after the solid/liquid separation in step b) is treated to recover metals present therein.

8. A process according to claim 1 wherein the temperature of the water is at least 20° C.

9. A process according to claim 8 wherein the temperature of the water is at least 20° C.

10. A process for extracting and recovering substantially pure lead or lead derivatives from metallurgical flue dusts containing lead sulphate and metals, comprising the steps of:
    a) leaching the flue dusts with a sulphuric acid solution containing a sufficient concentration of chloride ions to solubilize the metals in the solution and convert solid lead sulphate to solid lead chloride, with the proviso that the concentration of chloride ions is not sufficient to solubilize substantial amounts of lead and the pH of the sulphuric acid is not higher than 0.5;
    b) carrying a solid/liquid separation on the slurry which results from the leaching step a) to obtain a solid fraction and a sulphuric acid fraction;
    c) leaching the solid fraction obtained in step b) with water to selectively dissolve lead chloride therein;
    d) recovering the lead chloride solution of step c) after solid/liquid separation; and
    e) optionally converting the lead chloride to lead metal or other lead derivatives, whereby substantially all the lead present in the flue dusts has been extracted therefrom.

11. A process according to claim 10 wherein the flue dusts are obtained from copper smelting operations.

12. A process according to claim 9 wherein before carrying out step a), the flue dust is submitted to the following preliminary treatment:
    i) flue dusts are mixed in water to form a slurry that is submitted to gravimetric separation to produce a concentrate of splash particles of slag and matte, and a residue of smaller particles;
    ii) the concentrate of splash particles is returned to primary pyrometallurgical vessel and the smaller particles are further treated in accordance with the process of claim 9.

13. A process according to claim 10 wherein the acidic solution obtained after the solid/liquid separation in step b) is treated to recover metals present therein.

14. A process according to claim 9 wherein the sulphuric acid solution contains sodium chloride.

15. A process according to claim 14 wherein the mass ratio (sulphuric acid mass/lead sulphate mass) and (sodium chloride mass/lead sulphate mass) varies from 1.0 to 2.0.

* * * * *

UNITED STATES PATENT AND TRADEMARK OFFICE
CERTIFICATE OF CORRECTION

PATENT NO. : 5,961,691

DATED : October 5, 1999

INVENTOR(S) : DENYS PINARD, ET AL.

It is certified that error appears in the above-identified patent and that said Letters Patent is hereby corrected as shown below:

On the title page:

[73] Assignee: "Noranda, Inc., Canada" should read --Noranda, Inc., Toronto, Canada--.

COLUMN 1
 Line 19, "there" should read --their--.

COLUMN 2
 Line 38, "1,5" should read --1.5--.

COLUMN 3
 Line 6, "carrying" should read --carrying out--.

COLUMN 5
 Line 61, "cristalline" should read --crystalline--.

UNITED STATES PATENT AND TRADEMARK OFFICE
CERTIFICATE OF CORRECTION

Page 2 of 2

PATENT NO. : 5,961,691

DATED : October 5, 1999

INVENTOR(S) : DENYS PINARD, ET AL.

It is certified that error appears in the above-identified patent and that said Letters Patent is hereby corrected as shown below:

COLUMN 6
Line 62, "embodiment," should read --embodiments,--.

COLUMN 8
Line 24, "carrying" should read --carrying out--; and
Line 54, "claim 9" should read --claim 10--.

Signed and Sealed this

Fifteenth Day of May, 2001

Attest:

NICHOLAS P. GODICI

Attesting Officer  Acting Director of the United States Patent and Trademark Office